United States Patent
Onfroy et al.

(10) Patent No.: US 9,950,785 B2
(45) Date of Patent: Apr. 24, 2018

(54) ARCHITECTURE OF AN AIRCRAFT BRAKING SYSTEM

(71) Applicant: SAFRAN LANDING SYSTEMS, Velizy Villacoublay (FR)

(72) Inventors: Dominique Onfroy, Velizy-Villacoublay (FR); Brian Goyez, Velizy-Villacoublay (FR); Steve Coustenoble, Velizy-Villacoublay (FR); Eric Evenor, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 15/365,017

(22) Filed: Nov. 30, 2016

(65) Prior Publication Data
US 2017/0152027 A1    Jun. 1, 2017

(30) Foreign Application Priority Data
Dec. 1, 2015 (FR) ...................... 15 61681

(51) Int. Cl.
| | |
|---|---|
| *B64C 25/44* | (2006.01) |
| *H04L 12/42* | (2006.01) |
| *F16D 65/18* | (2006.01) |
| *H04L 12/44* | (2006.01) |
| *H04L 29/08* | (2006.01) |
| *F16D 121/24* | (2012.01) |

(52) U.S. Cl.
CPC .............. *B64C 25/44* (2013.01); *F16D 65/18* (2013.01); *H04L 12/42* (2013.01); *H04L 12/44* (2013.01); *H04L 67/12* (2013.01); *F16D 2121/24* (2013.01)

(58) Field of Classification Search
CPC ..... B64C 25/44; F16D 65/18; F16D 2121/24; H04L 12/44; H04L 12/42; H04L 67/12
See application file for complete search history.

(56) References Cited

U.S. PATENT DOCUMENTS

2013/0253736 A1* 9/2013 Frank ................. B64C 25/426
701/3

FOREIGN PATENT DOCUMENTS

| | | |
|---|---|---|
| EP | 1 498 332 A1 | 1/2005 |
| EP | 1 739 010 A1 | 1/2007 |
| EP | 2 316 701 A1 | 5/2011 |
| EP | 2 719 592 A1 | 4/2014 |

OTHER PUBLICATIONS

French Search Report Written Opinion for FR 1561681 dated May 4, 2016.

* cited by examiner

*Primary Examiner* — Rodney A Butler
(74) *Attorney, Agent, or Firm* — Sughrue Mion, PLLC (57) ABSTRACT

Architecture of an aircraft braking system having a brake (20) comprising a plurality of electromechanical actuators (25), with each electromechanical actuator (25) comprising a power module and a digital communication module (26). The brake digital communication modules are interconnected to form a digital network (30). The system also has two control units (22*a*, 22*b*) adapted for generating digital signals for controlling electric motors and one network interconnection member (23) connected to two control units and incorporated in the digital network for distributing the digital control signals to the digital communication modules via the digital network.

20 Claims, 3 Drawing Sheets

ARCHITECTURE OF AN AIRCRAFT BRAKING SYSTEM

The invention relates to the field of architectures of aircraft braking system.

BACKGROUND OF THE INVENTION

Many systems are provided aboard aircrafts, which consist of mobile parts which have to move.

Wing elements (for example an aileron, a flap, an air brake), elements of the landing gear (for example a landing gear strut movable between an extended position and a retracted position, or a plunger of a brake of a wheel which slides relative to brake friction members), elements making it possible to implement variable geometry turbines, elements of a pump or a fuel metering mechanism, elements of the thrust reversers, elements of a propeller pitch driving mechanism (for example on an helicopter or a turboprop engine), etc. belong to such mobile parts.

On modern aircrafts, more and more electromechanical actuators are used to implement such mobile parts. As a matter of fact, the advantages of using electromechanical actuators are numerous: simple electric distribution and driving, flexibility, simplified maintenance operations, etc.

An electromechanical actuator conventionally comprises a mobile actuating member which moves the mobile part, an electric motor intended to drive the mobile actuating member and thus the mobile part, and one or more sensor(s) for the various parameters of the electromechanical actuator.

An airborne electric actuating system wherein such an electromechanical actuator is integrated conventionally implements the following functions: definition of a set-point according to the function to be fulfilled (for instance a speed, position or force set-point), measurement of one or more electromechanical actuator servo-control parameter(s) (for instance speed, position, force), execution of a servo-control loop enabling the electromechanical actuator to reach the set-point, generation of electric current supplying the electric motor, and transformation, by the electric motor, of the electric energy into a mechanical energy which drives the actuating member and thus the mobile part.

The functions of executing the servo-control loop and generating electric supply current are generally implemented in one or more centralized computer(s): this is called a centralized architecture.

Figure 1:
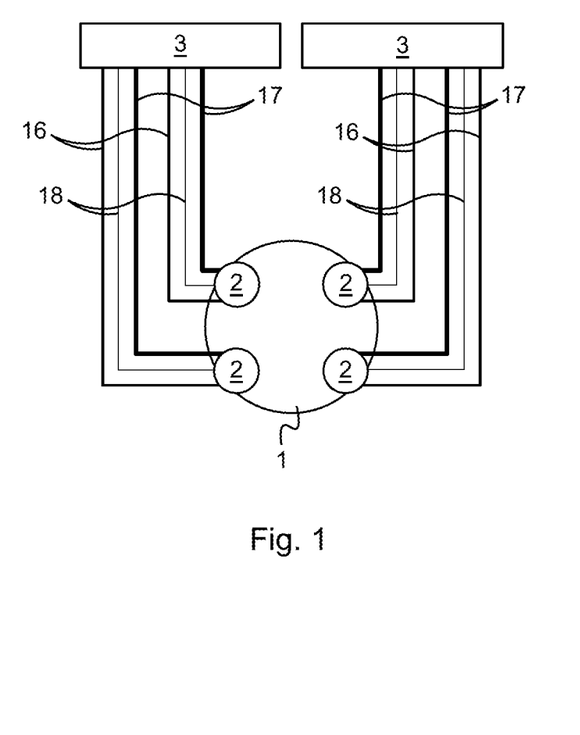
FIG. 1 shows a braking system architecture of the prior art.

In reference with FIG. 1, a known aircraft brake 1 comprises four electromechanical actuators 2 which are grouped in two distinct arrays of two electromechanical actuators 2. The electromechanical actuators 2 of a distinct array are connected to the same centralized computer 3 positioned in the aircraft bay. The electric motor of each electromechanical actuator 2 receives a three-phase electric current supplying the centralized computer 3 which the electromechanical actuator 2 is connected to, and each electromechanical actuator 2 transmits measurements of a servo-control parameter to the centralized computer 3 (for instance, measurements of the angular position of the rotor of the electric motor).

Figure 2:
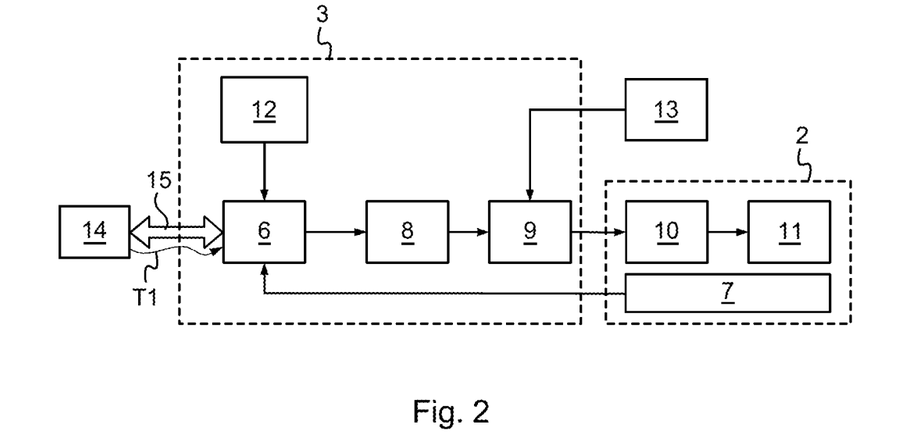
FIG. 2 shows an actuating system of the prior art comprising a centralized computer and an electromechanical actuator, with the actuating system being intended to be integrated into the architecture of FIG. 1.

The generation of the three-phase electric current supplying the electromechanical actuator 2 in such a centralized architecture will now be described in greater details while referring to FIG. 2. A <<high level>> external set-point is generated by external set-point generating means 14 and is transmitted to each centralized computer 3 via a digital bus 15 (a transmission symbolized by reference T1 in FIG. 2). In the case of a braking system architecture, such external set-point is representative of a request for braking generated by a pilot of the aircraft. The external set-point is transmitted to processing means 6 of the centralized computer 3. The processing means 6 of the centralized computer 3 then control and drive the electromechanical actuator 2 including one or more servo-control loop(s). The electromechanical actuator 2 transmits the measurements of one or more servo-control parameter(s) obtained from a sensor 7 to the centralized computer 3, with said measurements being the servo-control loop feedback signal. The servo-control loop output signal is transmitted to a power module 8 drive, then to a power module 9 of the centralized computer 3 which generates the three-phase electric current supplying the electric motor 10 of the electromechanical actuator 2. The electric motor 10 then drives the actuating member 11. Implementing the servo-control loop requires parameters stored in a memory 12 of the centralized computer 3. The power module 9 (which comprises an inverter, for instance) of the centralized computer 3 is supplied by a supply unit 13 outside the centralized computer 3.

It should be noted that such centralized architecture has some drawbacks. First, while referring again to FIG. 1, it can be seen that the architecture shown requires using at least nine electric wires per electromechanical actuator 2: three supply wires 16 for the three phases of the electric motor (symbolized by one single line in FIG. 1), four communication wires 17 (symbolized by a single line in FIG. 1) for sending back to the centralized computers 3 the angular position measurements of the rotor of the electric motor 10, and two supply wires 18 (symbolized by a single line in FIG. 1) for supplying an element for locking the electromechanical actuator 2 making it possible to implement a parking brake. Such electric wires 16, 17, 18 are integrated in cable assemblies which run from the bay to the brake 1 and which are cumbersome and heavy. The extensive length of the cable assemblies wherein the supply wires 16 and thus the currents supplying the electric motors 10 run makes it necessary to use common mode current filtering circuits which increase the mass, complexity and cost of the computers 3.

OBJECT OF THE INVENTION

The invention aims at reducing the overall dimensions, mass, complexity and cost of a braking system.

SUMMARY OF THE INVENTION

To reach this goal, a braking system architecture for an aircraft is proposed, which comprises:
- a brake intended to brake a wheel of the aircraft, with the brake comprising friction members and a plurality of electromechanical actuators to apply a braking force onto the friction members and thus exert a braking torque onto the wheel, with each electromechanical actuator comprising a body wherein an electric motor, a power module for generating a current supplying the electric motor and a digital communication module are integrated, with the digital communication modules of the electromechanical actuator of the brake being interconnected to form a digital network;
- a supply unit intended to supply the power modules by providing same with a supply voltage;
- two control units adapted to generate digital signals for controlling the electric motors intended to the digital communication modules which transmit the digital control signals to the power modules, so that each power module generates the supply current from the supply voltage and the digital control signals which are intended thereto;

one network interconnection member connected to two control units and incorporated in the digital network for distributing the digital control signals to the digital communication modules via the digital network.

The generation of currents supplying the electric motors through the power modules positioned inside the electromechanical actuators makes it possible to reduce the number of electric wires circulating from the bay of the aircraft to the brake, and thus to reduce the mass and overall dimensions of the cable assemblies wherein such electric wires are integrated. As the motor supply current no longer circulates in the cable assemblies, using common mode current filtering circuits is no longer necessary. The mass, complexity and cost of the control units are thus reduced.

It should be noted here too that the communalization of the control functions and the arrangement of the communication modules as a digital network make it possible to easily integrate (or remove) one actuator in/from the architecture. The architecture is thus particularly flexible and can be used with various programs, which reduces its cost.

Other characteristics and advantages of the invention will become apparent upon reading the following description of particular non-restrictive embodiments of the invention.

BRIEF DESCRIPTION OF THE DRAWINGS

Reference is made to the appended drawings, wherein.

DETAILED DESCRIPTION OF THE INVENTION

The invention is implemented here on an aircraft which comprises a plurality of main landing gears each carrying a plurality of so-called "braked" wheels, i.e. a plurality of wheels equipped with a brake intended to brake the aircraft. The present description relates to one single braked wheel, but the invention may of course similarly apply to all or part of the aircraft braked wheels.

Figure 3:
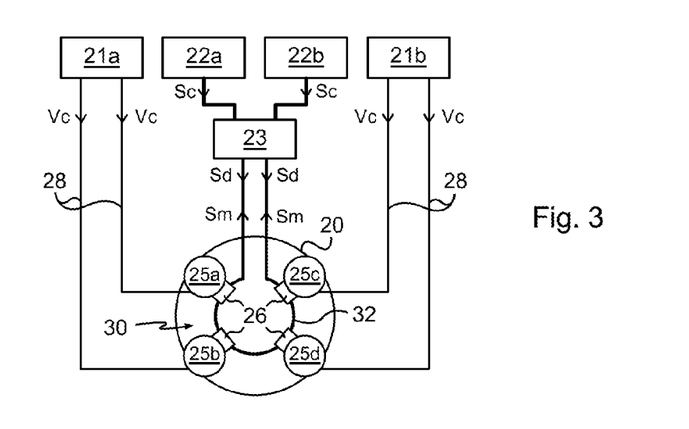
FIG. 3 shows a braking system architecture according to a first embodiment of the invention.

In reference to FIG. 3, a braking system architecture according to a first embodiment of the invention thus comprises a brake 20 intended to brake a wheel of the aircraft, a first supply unit 21a, a second supply unit 21b, a first control unit 22a, a second control unit 22b and a network switch 23. It should be noted here that it would be possible to use a different network interconnection member, such as a router or a concentrator (or <<hub>>), instead of a network switch, as well.

The brake 20 comprises an actuator-holder whereon four braking electromechanical actuators 25a, 25b, 25c, 25d and friction members, i.e. a stack of carbon disks are mounted.

The four electromechanical actuators 25 are used to apply a braking force onto the stack of carbon disks and thus exert a braking torque onto the wheel which slows down the rotation of the wheel and thus slows the aircraft down when the latter touches the ground.

Each electromechanical actuator 25 comprises a body attached to the actuator-holder, a plunger and a locking member adapted for locking the plunger in position. An electric motor, a power module and a digital communication module 26 are integrated into the body of each electromechanical actuator 25.

The plunger is actuated by the electric motor to slide and apply the braking force onto the stack of carbon disks.

The power module makes it possible to generate an alternating supply current which circulates in three phases of the electric motor when the plunger has to be actuated to brake the wheel. For this purpose, the power module comprises an inverter comprising a plurality of switches which are so controlled as to transform a direct supply voltage Vc into an alternating three-phase voltage at which the current supplying the electric motor is generated.

The supply voltages Vc received by the power modules of the four electromechanical actuators 25 of the brake 20 are delivered by the first supply unit 21a and the second supply unit 21b.

The four electromechanical actuators 25 are grouped into a first array and a second distinct array, with the first array comprising the electromechanical actuators 25a and 25b and with the second array comprising the electromechanical actuators 25c and 25d.

The first supply unit 21a supplies the supply voltage Vc to the power modules of the electromechanical actuators 25a and 25b of the first array, whereas the second supply unit 21b supplies the supply voltage to the power modules of the electromechanical actuators 25c and 25d of the second array.

To receive the supply voltage Vc, each electromechanical actuator 25 is connected by two power supply wires 28 to the first supply unit 21a or to the second supply unit 21b.

The first supply unit 21a and the second supply unit 21b are placed in the bay, in the aircraft fuselage, above the landing gear.

Besides, the power module of each electromechanical actuator 25 uses a digital control signal Sc to control the inverter switches.

The digital control signals Sc of the four electromechanical actuators 25 are generated by the first control unit 22a and by the second control unit 22b.

This time, each control unit 22 generates digital control signals Sc to be sent to two or four electromechanical actuators 25. The first control unit 22a and the second control unit 22b are thus redundant, so that the loss of one of the two control units 22 does not entail a complete loss of braking performances.

The first control unit 22a and the second control unit 22b are placed in the bay, in the aircraft fuselage, above the landing gear.

The distribution of the digital control signals Sc to the power modules of the four electromechanical actuators 25 is executed via the digital communication modules 26 of the four electromechanical actuators 25, with each digital communication module 26 of one electromechanical actuator transmitting to the power module and thus to the inverter of the power module of said electromechanical actuator 25 the digital control signals Sc which are to be sent thereto.

The digital communication modules 26 of the four electromechanical actuators 25 are interconnected to form a digital network 30 (digital network means, here, an assembly of interconnected communicating devices exchanging data as digital signals). The digital network 30 is here ring-shaped.

The network switch 23, which is connected to the first control unit 22a and to the second control unit 22b, is integrated in the digital network 30.

The network switch 23 is thus connected to the digital communication modules 26 of two electromechanical actuators 25 of the brake 25a and 25c, so as to build, too, one of the entities forming the closed loop of the ring-shaped digital network 30, with the digital communication modules 26 of the four electromechanical actuators 25 building the other entities. Each entity (digital communication module 26 or network switch 23) of the digital network 30 is connected by four communication electric wires 32 to two distinct entities.

The network switch 23 manages the operation of the digital network 30 by distributing the digital control signals Sc from the first control unit 22a and the second control unit 22b to the digital communication modules 26 via the digital network 30.

The network switch 23 is here positioned with the first control unit 22a and with the second control unit 22b in the same box (which is thus placed in the bay, in the aircraft fuselage, above the landing gear).

The transmission to the digital communication modules 26 and thus to the power modules of the digital control signals Sc from the control units 22, and the supply of the power modules by the supply voltage Vc from the supply units 21 thus require sixteen electric wires which run from the top of the landing gear to the brake 20, instead of the thirty-six electric wires of the architecture of FIG. 1 (or even more when the actuator includes other members: other sensors, etc.).

It should be noted that the digital network 30 which has just been disclosed is not used for transmitting the digital control signals Sc to the power modules of the electromechanical actuators 25 only.

Uplink digital signals Sm are also transmitted from the brake 20 to the control units 22 via the digital network 30 and thus via the network switch 23.

The uplink digital signals Sm firstly comprise digital measurement signals emitted by the digital communication modules 26 and emitted by sensors integrated in the electromechanical actuators 25. The digital measurement signals are here signals for measuring the angular position of the rotors of the electric motors, signals for measuring the currents supplying the electric motors, and signals for measuring the force produced by the electromechanical actuators 25 actuating member.

The angular position measuring signals are emitted, for each electromechanical actuator 25, from an angular position sensor integrated in said electromechanical actuator 25.

The angular position measuring signals are emitted, for each electromechanical actuator 25, from a current sensor integrated in said electromechanical actuator 25.

The force measuring signals are emitted, for each electromechanical actuator 25, from a force sensor integrated in said electromechanical actuator 25.

The angular position, current and force measuring signals are digitalized by the communication modules 26, emitted on the digital network 30 and used by the control units 22 for generating the digital control signals Sc and control the electric motors of the four electromechanical actuators 25.

The uplink digital signals Sm then comprise electromechanical actuators 25 monitoring signals emitted by the digital communication modules 26.

The electromechanical actuators 25 monitoring signals are intended to supply a state of the electromechanical actuators 25 from which the control units 22 may make the decision to order a maintenance operation, or to totally or partially deactivate one or more electromechanical actuator (s) 25.

Eventually, the uplink digital signals Sm comprise measurement signals transmitted to the electromechanical actuators by an external sensor positioned on the wheel or on the brake (not shown in FIG. 3). The external sensor is here a tachometer intended for measuring the rotational speed of the wheel. The external sensor is integrated in the digital network 30 (it also forms one entity of the ring digital network). It comprises a digital interface which, like the digital communication modules 26 mentioned above, enables the external sensor to transmit the rotational speed measurements to the control units 22 via the digital network 30.

Besides, in addition to the digital control signals Sc, additional downlink digital signals Sd are transmitted from the control units 22 to the brake 20 via the digital network 30.

The additional downlink digital signals Sd firstly comprise electromechanical actuators 25 functional test signals and sanction signals.

The functional test signals trigger the execution of functional tests by the electromechanical actuators 25 with a view to making a diagnosis relating to the operation of the electromechanical actuators 25 (and, optionally, relating to the efficiency of communications from and to the electromechanical actuators 25).

The sanction signals enable the control units 22 to "penalize" an electromechanical actuator 25 by totally or partially deactivating same, or by excluding the digital communication module 26 thereof from the digital network 30.

The additional downlink digital signals Sd also comprise signals for controlling another equipment mounted on the wheel, i.e. here a brake fan 20 (not shown in FIG. 3). The brake fan 20 is integrated in the digital network (it also forms one entity of the ring digital network). It comprises a digital interface which, like the digital communication modules 26 mentioned above, enables the brake fan 20 to receive the control signals from the control units 22 via the digital network 30.

Figure 4:
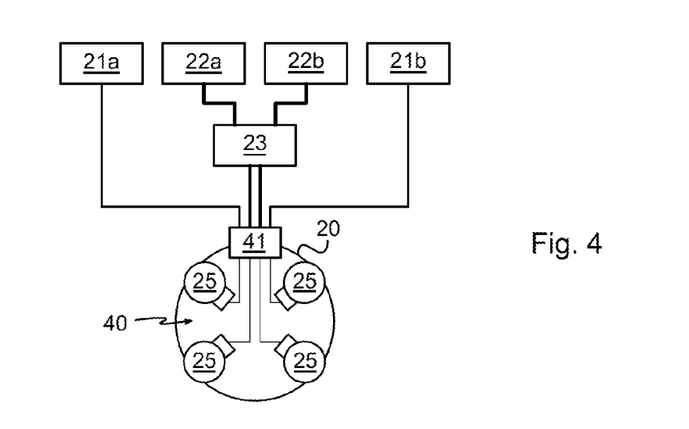
FIG. 4 shows a braking system architecture according to a second embodiment of the invention.

In the braking system architecture according to a second embodiment of the invention, shown in FIG. 4, the digital network, this time, is a star digital network 40.

The network switch 23 forms a node of the digital star network 40 which all the electromechanical actuators 25 of the brake 20 are connected to.

It should be noted that the braking system architecture according to the second embodiment of the invention comprises, in addition to the four electromechanical actuators 25, the two power supply units 21, the two control units 22 and the network switch 23, a connexion box 41 mounted on the brake actuator-holders 20.

The four electromechanical actuators 25, the two power supply units 21, the two control units 22 and the network switch 23 are connected to the connexion box 41.

The connexion box 41 receives the continuous supply voltage and the downlink digital signals mentioned above, and distributes same to the electromechanical actuators 25 and to the tachometer and to the brake fan. The connexion box 41 also receives the uplink digital signals mentioned above, and distributes same to the network switch 23 which transmits same to both control units 22.

Advantageously, whatever the embodiment of the braking system architecture, the locking member of each electromechanical actuator 25 is integrated in the digital network 30 or 40 too. The locking member is then locally supplied from the supply voltage received by the electromechanical actuator 25 and issued by one of the supply units 21. The locking member receives control orders via the digital network 30, 40 and emits a status on the digital network 30, 40.

The way each control unit 22 controls one of the four electromechanical actuators 25, and thus generates the digital control signals Sc to be sent to such electromechanical actuator 25 will now be described in greater details.

Figure 5:
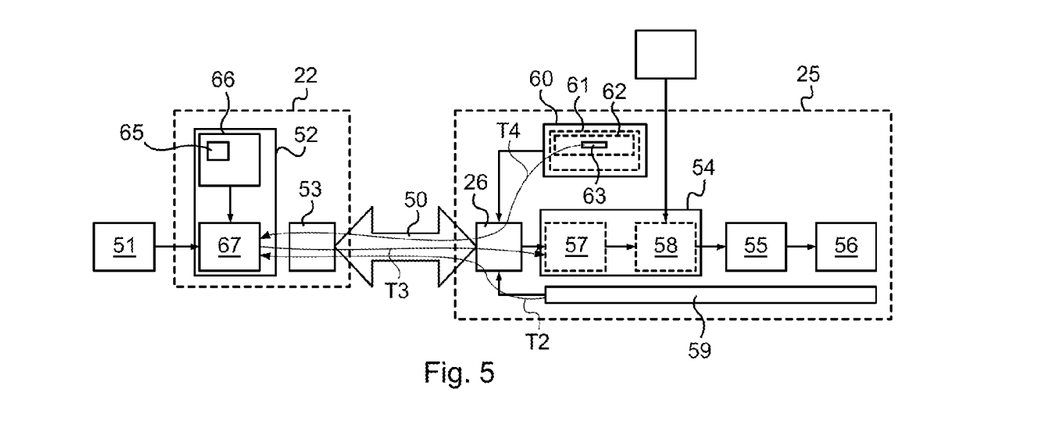
FIG. 5 shows an actuating system according to a first embodiment intended to be integrated into one of the architectures of the invention.

Referring to FIG. 5, it is considered that one of the two control units 22 and one of the four electromechanical actuators 25 form an actuating system according to a first embodiment of the invention which, in addition to the control unit 22 and the electromechanical actuator 25, comprises a digital transmission channel 50 which connects the control unit 22 and the electromechanical actuator 25. The following also applies to both control units 22 and to the four electromechanical actuators 25 described above.

In the braking system architectures of FIGS. 3 and 4, the digital transmission channel 50 consists of the electric wires connecting the control unit 22 with the network switch 23, through the network switch 23, through the connexion box 41 as regards FIG. 4, and through the various elements of the digital network (electric wires, communication modules 26 of other electromechanical actuators 25) which separate the digital communication module 26 of the electromechanical actuator 25 involved from the network switch 23.

The control unit 22 comprises processing means 52, and a digital communication interface 53.

As seen above, the electromechanical actuator 25 comprises a communication module 26, a power module 54, an electric motor 55, a plunger 56 and measuring means 59 comprising sensors (a current sensor, an angular position sensor, and a force sensor). The power module 54 comprises an inverter control 57 and an inverter 58.

Additionally, the electromechanical actuator 25 comprises a non-volatile memory 60 wherein stored data 61 including configuration data 62 specific to the electromechanical actuator is stored.

The configuration data 62 comprises servo-control parameters 63 specific to the electromechanical actuator 25, the function of which is explained hereunder.

The non-volatile memory 60, programmed during the manufacturing of the electromechanical actuator 25, is compatible with the environmental conditions (temperature, vibrations, shocks, electromagnetic perturbations, etc.) which the electromechanical actuator 25, which is mounted on a brake actuator-holder, is exposed to. The non-volatile memory 60 is advantageously integrated in a semi-conductor component of the digital communication module 26.

The angular position measured by the angular position sensor of the electromechanical actuator 25 and the current measured by the current sensor of the electromechanical actuator 25 are electromechanical actuator 25 servo-control magnitudes.

The measuring means 59 convert the measured servo-control magnitudes into digital measurement signals representative of the servo-control magnitudes.

To control the electromechanical actuator 25, the processing means 52 of the control unit 22 execute a servo-control algorithm 67, the native code 65 of which is stored in a memory 66 of the processing means 52.

The servo-control algorithm 67 implements three servo-control loops intended to control the power module 54 of the electromechanical actuator 25 via the digital channel 50: a current/torque servo-control loop, a speed servo-control loop and a position servo-control loop.

The set-point signal of each servo-control loop is a set-point generated by external set-point generating means 51.

The three servo-control loops are interleaved: the output of one servo-control loop is the input of another loop.

The position servo-control loop receives a set-point generated by the external set-point generating means 51. The position servo-control loop sends a set-point to the speed servo-control loop, which sends one to the current/torque servo-control loop.

The feedback signal of the current/torque servo-control loop is the digital measurement signal representative of the current, and the feedback signals of the speed and position servo-control loops are the digital measurement signals representative of the angular position. The feedback signals are transmitted by the communication module 26 of the electromechanical actuator 25 to the control unit 22 via the digital transmission channel 50 (transmission T2 in FIG. 5).

The current/torque servo-control loop produces an electric motor digital control signal 55 to be sent to the power module 54 (transmission T3 in FIG. 5). The digital control signal thus comprises a duty cycle making it possible to control the inverter 58 switches.

The digital control signals are transmitted to the power module 54 of the electromechanical actuator 25 via the digital interface 53 of the control unit 22, the digital transmission channel 50 and the digital communication module 26 of the electromechanical actuator (transmission T3 in FIG. 5). The inverter control 57 of the power module 54 then controls the inverter 58 which generates a current supplied to the electric motor 55 to drive the plunger 56 of the electromechanical actuator 25 according to the set-point.

Implementing the servo-control loops uses the servo-control parameters 63 specific to the electromechanical actuator 25, which comprise, here, a proportional coefficient, an integral coefficient and a derived coefficient, and a position limitation, a speed limitation and a power limitation of the electromechanical actuator 25.

Prior to using the electromechanical actuator 25, for example upon starting the control unit 22 and the electromechanical actuator 25, the processing means 52 of the control unit 22 thus acquire the servo-control parameters 63 stored in the non-volatile memory 60 of the electromechanical actuator 25 and integrate same into the servo-control loops (transmission T4 in FIG. 5). The processing means 52 then have all data required for executing the servo-control algorithm 67 and the servo-control loops.

Any modification in the design of the electromechanical actuator 25 requiring a modification in the servo-control parameters 63 specific to the electromechanical actuator 25 can be implemented by storing the new servo-control parameters 63 in the non-volatile memory 60 of the electromechanical actuator 25 only, and thus without modifying the control unit 22. The costs entailed in the modification in the design of the electromechanical actuator 25 are thus reduced.

Figure 6:
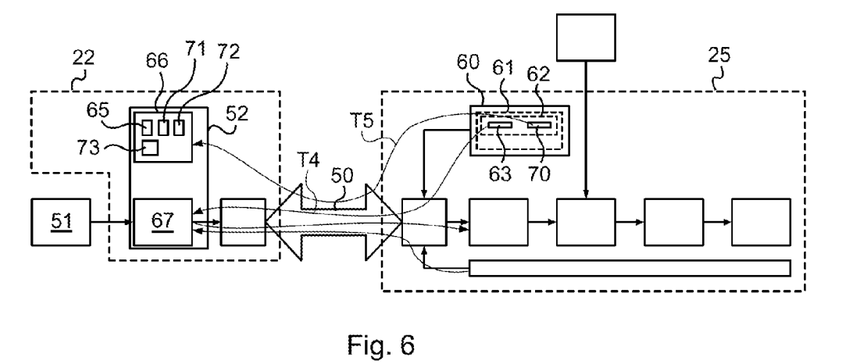
FIG. 6 shows an actuating system according to a second embodiment intended to be integrated into one of the architectures of the invention.

Referring to FIG. 6, the actuating system according to a second embodiment of the invention again comprises the control unit 22, the electromechanical actuator 25 and the digital transmission channel 50.

The non-volatile memory 60 of the electromechanical actuator 25 of the system according to the second embodiment of the invention is also used for parameterizing other algorithms.

The data configuration 62 among the stored data stored 61 in the non-volatile memory 60 comprises, in addition to the servo-control parameters 63 of the servo-control algorithm 67, parameters 70 of a failure detection algorithm 71 and/or a trend following algorithm 72 and/or a cycle counting algorithm 73.

The failure detection algorithm 71, the trend following algorithm 72 and the cycle counting algorithm 73 are stored in the memory 66 of the processing means 52 of the control unit 22. When one of these algorithms 71, 72, 73 has to be executed, the control unit 22 acquires the corresponding parameters 70 (transmission T5 in FIG. 6).

Figure 7:
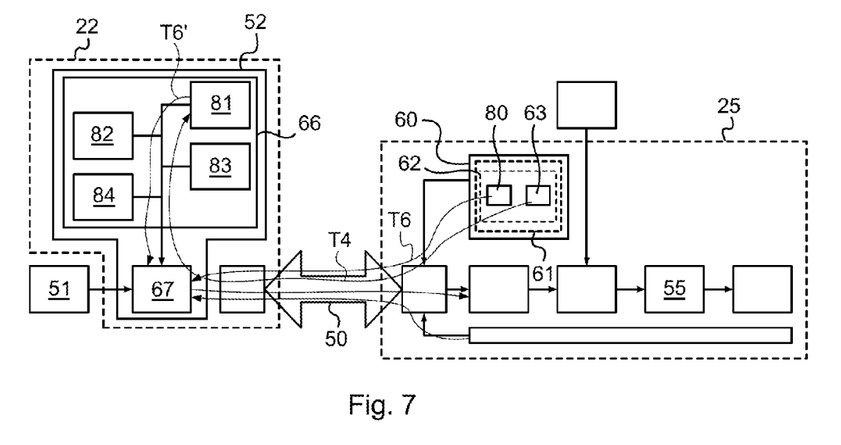
FIG. 7 shows an actuating system according to a third embodiment intended to be integrated into one of the architectures of the invention.

Referring to FIG. 7, the actuating system according to a third embodiment of the invention again comprises the control unit 22, the electromechanical actuator 25 and the digital transmission channel 50.

The non-volatile memory 60 of the electromechanical actuator 25 of the actuating system according to the third embodiment of the invention is also used for storing an identifier 80 of a servo-control algorithm to be used for the electromechanical actuator 25.

The configuration data 62 of the stored data 61 stored in the non-volatile memory 60 comprises an identifier 80 which enables the processing means 52 of the control unit 22 to select the servo-control algorithm to be used among a list of servo-control algorithms stored in the memory 66 of the processing means 52.

The list of servo-control algorithms comprises a servo-control algorithm 81 for an electromechanical actuator with an alternating current motor, a servo-control algorithm 82 for an electromechanical actuator with a direct current motor, a servo-control algorithm 83 for an electromechanical actuator with a torque motor, a servo-control algorithm 84 for an electromechanical actuator with a step motor.

The electric motor 55 of the electromechanical actuator 25 is here an alternating current motor. Prior to using the electromechanical actuator 25, for example upon starting the control unit 22 and the electromechanical actuator 25, the processing means 52 of the control unit 22 thus acquire the identifier 80 stored in the non-volatile memory 60 of the electromechanical actuator 25 (transmissions T6 and T6" in FIG. 7). The processing means 52 select and then execute the servo-control algorithm 81 for an electromechanical actuator with an alternating current motor.

Changing the technology of the electric motor 55 of the electromechanical actuator 25 which requires using a different servo-control algorithm previously stored in the memory 66 of the processing means 52 can thus be implemented by storing the new identifier in the non-volatile memory 60 of the electromechanical actuator 25 only, without modifying the control unit 22.

Figure 8:
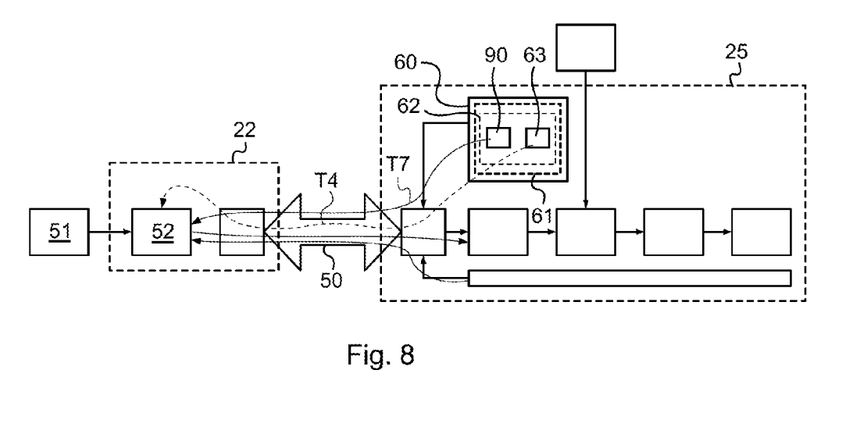
FIG. 8 shows an actuating system according to a fourth embodiment intended to be integrated into one of the architectures of the invention.

Referring to FIG. 8, the actuating system according to a fourth embodiment of the invention again comprises the control unit 22, an electromechanical actuator 25 and a digital transmission channel 50.

The non-volatile memory 60 of the electromechanical actuator 25 of the actuating system according to the fourth embodiment of the invention is also used for storing a native code 90 of an already parameterized servo-control algorithm of the electromechanical actuator 25.

Prior to using the electromechanical actuator 25, for example upon starting the control unit 22 and the electromechanical actuator 25, the processing means 52 of the control unit 22 thus acquire the native code 90 of the servo-control algorithm in the non-volatile memory (transmissions T7 in FIG. 8).

Designing the control unit 22 thus does not require a previous definition of the servo-control algorithm.

It should be noted here that the native code of any type of algorithm can be stored in the non-volatile memory and not only the native code of a servo-control algorithm (for instance, the native code of a failure detection algorithm and/or a trend following algorithm and/or a cycle counting algorithm).

Advantageously, and whatever the embodiment of an actuating system disclosed above, the non-volatile memory of the electromechanical actuator 25 can be used to store configuration data comprising electromechanical actuator 25 calibration data. The calibration data can be used by the control unit 22 to correct one or more set-point(s) of the servo-control loops or the digital measurement signals. The calibration data is, for example, data enabling a gradient correction, an offset correction or a correction according to the parameters measured by the sensors of the electromechanical actuator.

Storing the calibration data in the non-volatile memory 60 of the electromechanical actuator 25 makes it possible to simplify the development of the electromechanical actuator 25 during the designing and the manufacturing thereof, and thus to reduce the design and production costs of the electromechanical actuator 25. Besides, the system performances are enhanced when calibrating the electromechanical actuator 25 using the calibration data.

Whatever the embodiment of the actuating system described above, the non-volatile memory 60 may advantageously contain data supplied by the control unit 22. The non-volatile memory 60 is then read-accessible and/or write-accessible by the control unit 22. The stored data is routed between the electromechanical actuator 25 and the control unit 22 on the transmission channel 50, whatever the routing direction.

The data supplied by the control unit 22 here comprises information on the utilization of the electromechanical actuator 25, which is produced from other data stored in the non-volatile memory 60 of the electromechanical actuator 25, or which is obtained when the control unit 22 executes any algorithm.

Storing the utilisation information relative to the electromechanical actuator 25 in the non-volatile memory 60 thereof facilitates the future maintenance operations. A maintenance operator will have access to the information on the utilisation of the electromechanical actuator 25 without it being necessary to configure the control unit 22 or the electromechanical actuator 25 according to a specific maintenance configuration. Additionally, the future repair operations are facilitated. A repair operator will have access to the information on the utilisation of the electromechanical actuator 25 without it being necessary to transfer data from the control unit 22.

Whatever the embodiment of the actuating system described above, the non-volatile memory 60 may advantageously contain other information used by the servo-control algorithm, for monitoring, maintenance, production and delivery of the electromechanical actuator 25. Among such information, the reference or the serial number of the electromechanical actuator 25 can be cited.

Such information can specifically be used during the phase of initialisation of the electromechanical actuator 25.

Whatever the embodiment of the actuating system described above, the data stored 61 in the non-volatile memory 60 is advantageously protected by a checking tool of the cyclic redundancy check type which ensures the integrity of the stored data 61 and the detection of corruption of such stored data.

Whatever the embodiment of the actuating system disclosed above, the transmission channel 50 advantageously consists of a fast channel and a slow channel.

The digital data which requires a fast transmission (like a real-time transmission) is routed on the fast channel. This more particularly relates to the digital control signals and the digital measurement signals used in the servo-control loops.

The digital data which does not require a fast transmission is routed on the slow channel. This more particularly relates to the stored data 61 of the non-volatile memory 60 upon writing or reading such stored data 61.

The stored data 61 may further be read-accessible and/or write-accessible by a wireless interrogation device using RFID-type technology. Such wireless access is particularly interesting when carrying out maintenance operations on the electromechanical actuator 25.

The communication module advantageously comprises a component of the ASIC type which may be developed for several types of electromechanical actuators, which reduces the so-called <<not recurrent>> development costs of such electromechanical actuators.

Of course, the invention is not limited to the specific embodiments described above, but on the contrary, encompasses any alternative solution within the scope of the invention as defined in the claims.

Although the external sensor is mentioned to be a tachometer, one or more different external sensor(s) can be provided as well, for instance a disk stack temperature sensor typically a thermocouple), or a wheel tyre pressure sensor, or still a braking torque sensor.

Although the description above mentions that each electromechanical actuator comprises a non-volatile memory wherein the configuration data and the servo-control parameters are stored, the non-volatile memories can be integrated in the control units as well.

What is claimed is:

1. An architecture of an aircraft braking system comprising:
   a brake (20) intended to brake a wheel of the aircraft, with the brake comprising friction members and a plurality of electromechanical actuators (25) to apply a braking force onto the friction members and thus exert a braking torque onto the wheel, with each electromechanical actuator (25) comprising a body wherein an electric motor, a power module for generating a current supplying the electric motor and a digital communication module (26) are integrated, with the digital communication modules of the electromechanical actuators of the brake being interconnected to form a digital network (30; 40);
   a supply unit (21) intended to supply the power modules by providing same with a supply voltage (Vc);
   two control units (22a, 22b) adapted to generate digital signals (Sc) for controlling the electric motors intended to the digital communication modules which transmit the digital control signals to the power modules, so that each power module generates the supply current from the supply voltage and the digital control signals which are intended thereto;
   one network interconnection member (23) connected to two control units and incorporated in the digital network for distributing the digital control signals to the digital communication modules via the digital network.

2. The architecture according to claim 1, wherein the network interconnection member is a switch or a router or a hub.

3. The architecture according to claim 1, wherein each power module comprises an inverter.

4. The architecture according to claim 1, wherein the digital network (30) is a ring network and wherein the network interconnection member (23) and the digital communication modules (26) are entities in the ring network.

5. The architecture according to claim 1, wherein the digital network (40) is a star network and wherein the network interconnection member (23) is a node of the star network.

6. The architecture according to claim 5, further comprising a connection box (41) mounted on the brake and which the network interconnection member, the supply unit, the power modules and the digital communication modules are connected to.

7. The architecture according to claim 1, wherein both control units (22a, 22b) and the network interconnection member (23) are positioned in the same box.

8. The architecture according to claim 1, comprising two supply units (21a, 21b), with each supply unit being intended to supply a separate array of power modules.

9. The architecture according to claim 1, wherein uplink digital signals (Sm) are transmitted from the brake to the control units, via the digital network.

10. The architecture according to claim 9, wherein the uplink digital signals comprise measurement signals emitted by the digital communication modules and are delivered by sensors integrated in the electromechanical actuators.

11. The architecture according to claim 10, wherein the built-in sensors comprise sensors for detecting the angular position of the rotors of the electric motors and/or sensors for detecting the current supplying the electric motors and/or the force sensors.

12. The architecture according to claim 9, wherein the uplink digital signals comprise signals for monitoring the electromechanical actuators delivered by the digital communication modules.

13. The architecture according to claim 9, wherein the uplink digital signals comprise measurement signals delivered by a sensor outside the electromechanical actuators positioned on the wheel and/or the brake and incorporated in the digital network.

14. The architecture according to claim 13, wherein the external sensor comprises a sensor detecting the temperature of the brake friction members and/or a sensor detecting the pressure of a wheel tyre and/or a sensor detecting the wheel rotational speed and/or a sensor detecting the braking torque.

15. The architecture according to claim 9, wherein the uplink digital signals comprise status signals delivered by elements for locking the electromechanical actuators which are integrated in the digital network.

16. An architecture according to claim 1, wherein, in addition to the digital control signals, additional downlink digital signals (Sd) are transmitted from the control units to the brake via the digital network.

17. The architecture according to claim 16, wherein the additional downlink digital signals comprise electromechanical actuators functional tests signals and/or sanction signals.

18. The architecture according to claim 17, wherein the additional downlink digital signals comprise signals for controlling another item of equipment mounted on the wheel and/or the brake.

19. The architecture according to claim 18, wherein the other item of equipment is a brake fan.

20. The architecture according to claim 16, wherein the additional downlink digital signals comprise signals for controlling elements for locking the electromechanical actuators which are integrated in the digital network.

* * * * *